(12) United States Patent
Lee et al.

(10) Patent No.: US 8,887,885 B2
(45) Date of Patent: Nov. 18, 2014

(54) CLUTCH ACTUATOR FOR A VEHICLE

(71) Applicant: Hyundai Motor Company, Seoul (KR)

(72) Inventors: Jin Woo Lee, Ansan-si (KR); Eui Hee Jeong, Hwaseong-si (KR); Jeong Heon Kam, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 134 days.

(21) Appl. No.: 13/682,130

(22) Filed: Nov. 20, 2012

(65) Prior Publication Data

US 2013/0292224 A1 Nov. 7, 2013

(30) Foreign Application Priority Data

May 7, 2012 (KR) .......................... 10-2012-0047849

(51) Int. Cl.
*F16D 23/12* (2006.01)
*F16D 28/00* (2006.01)

(52) U.S. Cl.
CPC ................ *F16D 23/12* (2013.01); *F16D 28/00* (2013.01); *F16D 2023/126* (2013.01)
USPC ........................... 192/48.2; 192/90; 192/99 S

(58) Field of Classification Search
CPC ...................... F16D 2023/126; F16D 2125/645
USPC ............................................................. 192/90
See application file for complete search history.

(56) References Cited

U.S. PATENT DOCUMENTS 7,735,617 B2 * 6/2010 Ehrlich et al. ............... 192/84.6

FOREIGN PATENT DOCUMENTS

| DE | 10 2008 016 783 A1 | 10/2009 |
| DE | 10 2011 106 001 A1 | 1/2012 |
| EP | 1 734 273 A2 * | 12/2006 |
| EP | 2 336 587 A1 | 6/2011 |

* cited by examiner

*Primary Examiner* — Rodney H Bonck
(74) *Attorney, Agent, or Firm* — Morgan, Lewis & Bockius LLP

(57) ABSTRACT

A clutch actuator for a vehicle includes a movable member connected to a power generating unit and configured to be linearly moved by power provided by the power generating unit, and a lever having a pivoting point at one end thereof and to which a release fork is connected at an opposite end thereof to provide a point of application, the lever being configured such that a location of the point of application is varied such that the lever is rotated about the pivoting point when a force point is pushed by the movable member and a length between the point of application and the force point is shortened when the lever is rotated about the pivoting point and a rotating force of the lever is improved as the release fork is moved toward the pivoting point.

10 Claims, 5 Drawing Sheets

CLUTCH ACTUATOR FOR A VEHICLE

CROSS-REFERENCE TO RELATED APPLICATION

The present application claims priority of Korean Patent Application Number 10-2012-0047849 filed May 7, 2012, the entire contents of which application is incorporated herein for all purposes by this reference.

BACKGROUND OF INVENTION

1. Field of Invention

The present invention relates to a clutch actuator for a vehicle, and more particularly, to a clutch actuator for a vehicle which can operate a high load of a clutch by using an electric motor of a small capacity.

2. Description of Related Art

In recent years, hybrid vehicles, electric vehicles, automation of manual transmissions, and so on are being developed in various ways to improve fuel efficiency of vehicles by vehicle manufacturers. Among them, automated manual transmissions having the same level of transmission feelings and price competitiveness as general hydraulically controlled automatic transmissions while having higher price competitiveness than hybrid or electric cars and also improving fuel efficiency by 6% to 8% are developed competitively.

While an automated manual transmission uses a manual transmission mechanism of a conventional manual transmission, it differs from a transmission mechanism of a manual transmission in that an actuator controls an operation of a clutch and a gearshift not manually but automatically.

FIG. 1 illustrates a structure of a clutch actuator for a gearshift of a conventional automated manual transmission, and a motor 1 for generating a driving force of an actuator is connected to a push rod 3 through a reducer 2, and a release fork 4 is seesawed by a linear movement of the push rod 3 to operate a release bearing 5.

However, since a load for operating the release bearing rapidly increases as an operation stroke of the release bearing increases, a load of a motor increases to operate the release bearing while overcoming the operation load. Thus, a large current is consumed in a motor during an operation of the clutch, deteriorating a fuel improving effect of the vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the above-described problems associated with prior art. Various aspects of the present invention provide for a clutch actuator for a vehicle which operates a high load of a diaphragm spring installed in a clutch by using a motor of a small capacity, improving a fuel efficiency of the vehicle.

Various aspects of the present invention provide for a clutch actuator for a vehicle, including a movable member connected to a power generating unit and configured to be linearly moved by power provided by the power generating unit, and a lever which has a pivoting point at one end thereof and to which a release fork is connected at an opposite end thereof to provide a point of application, the lever being configured such that a location of the point of application is varied such that the lever is rotated about the pivoting point when a force point is pushed by the movable member and a length between the point of application and the force point is shortened when the lever is rotated about the pivoting point and a rotating force of the lever is improved as the release fork is moved toward the pivoting point.

A first length element may connect the pivoting point and the force point, a second length element may connect the force point and the point of application, and the length between the force point and the point of application may be shortened as the second length element is frictionally moved along an end of the lever connected to the release fork when the lever is rotated about the pivoting point.

The lever may be bent toward the movable member at a portion of the force point.

The power generating unit may be a motor, and a shaft of the motor and the movable member may be connected by means of a ball screw such that a rotation of the motor is converted into a linear movement of the movable member.

As one surface of the movable member pushing the lever may be inclined, the lever may be rotated while the lever may be frictionally moved along the inclined surface of the movable member when the lever is pushed by the movable member.

The inclined surface of the movable member may have a shape of a flat surface.

The inclined surface of the movable member may have a shape of a curved surface.

A bearing may be installed at an opposite side of the movable member to which a repulsive force is applied as the movable member pushes the lever.

One end of a third length element may be fixed to an opposite side of the pivoting point, and a resilient member is resiliently provided at an opposite end of the third length element to provide a resilient force pushing out the third length element in a direction where the lever is rotated during rotation of the lever, increasing a rotating force of the lever.

The resilient member may be a spring.

A plurality of clutch actuators may be installed, and the release forks may be independently installed in clutches provided in a double clutch such that ends of the levers installed in the clutch actuators are coupled to the release forks, respectively.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
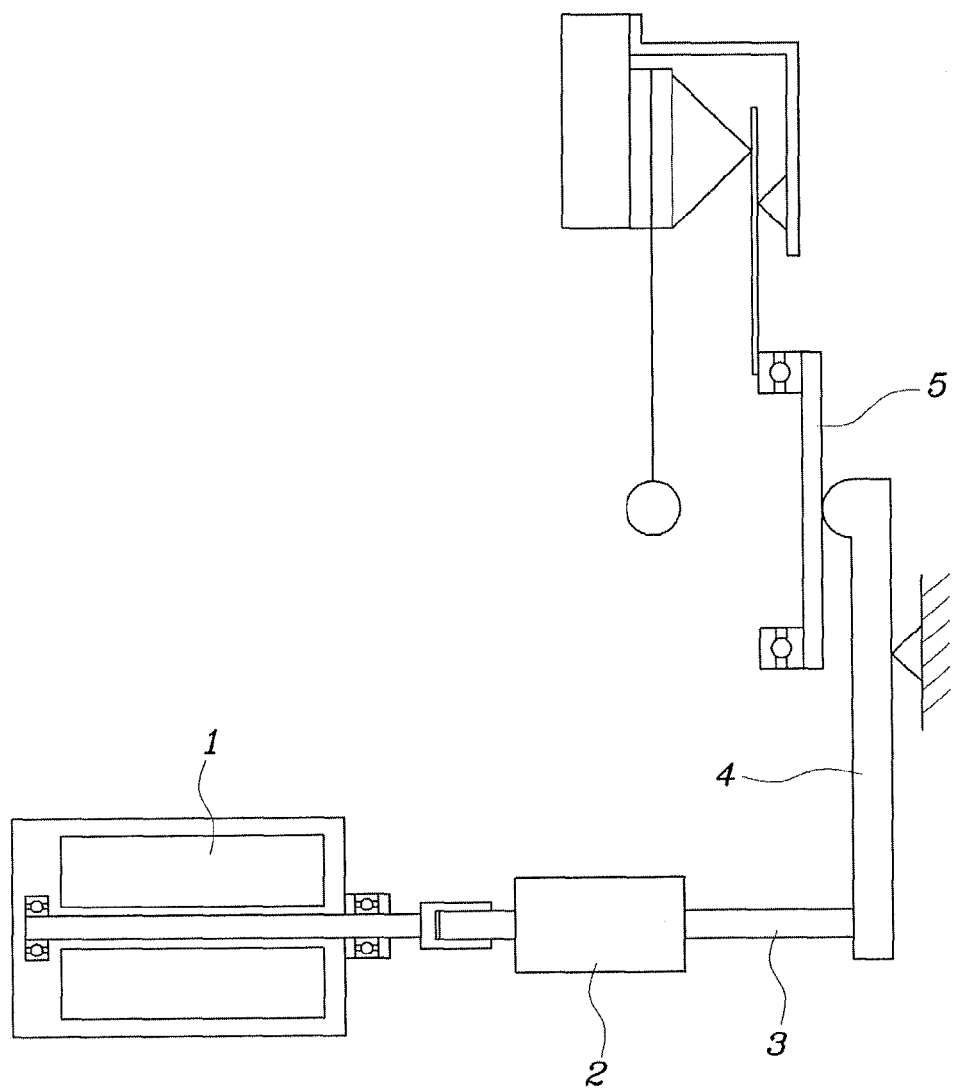
FIG. 1 is a view illustrating a structure of a clutch actuator according to the related art.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A clutch actuator for a vehicle according to the present invention illustrated in FIGS. 2 to 6 includes a movable member 20 connected to a power generating unit and configured to be linearly moved by power provided by the power generating unit, and a lever 30 which has a pivoting point R at one end thereof and to which a release fork 50 is connected at an opposite end thereof to provide a point W of application, the lever 30 being configured such that a location of the point W of application is varied such that the lever 30 is rotated about the pivoting point R when a force point F1 is pushed by the movable member 20 and a length b between the point W of application and the force point F1 is shortened when the lever 30 is rotated about the pivoting point R and a rotating force of the lever 30 is improved as the release fork 50 is moved toward the pivoting point R.

Figure 2:
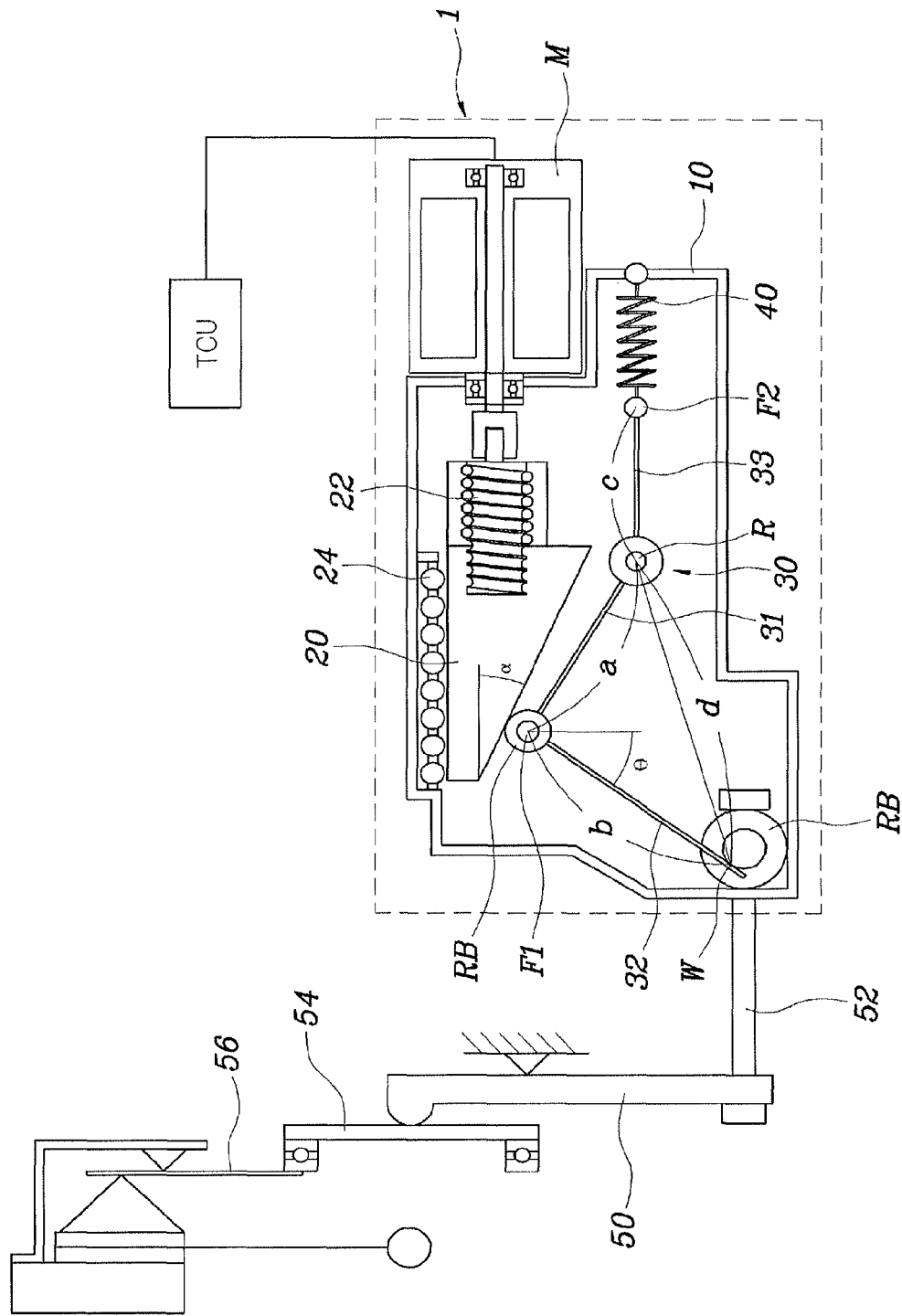
FIG. 2 is a view illustrating an entire structure of an exemplary clutch actuator according to the present invention before an operation of the clutch actuator.

As illustrated in FIG. 2, the lever 30 is configured such that a first length element 31 connects the pivoting point R and the force point F1 and a second length element 32 connects the force point F1 and the point W of application. The length b between the force point F and the point W of application is shortened as the second length element 32 is frictionally moved along an end of the lever 30 connected to the release fork 50 when the lever 30 is rotated about the pivoting point R.

In this case, the lever 30 is bent toward the movable member 20 at a portion of the force point F1 so that the movable member 20 can firmly push the force point F1 of the lever 30.

In addition, a transmission control unit (TCU) may be electrically connected to the power generating unit to receive an electric signal for automatically controlling the power generating unit from the TCU.

The movable member 20 is coupled to an end of the power generating unit, the movable member 20 is installed within the actuator housing 10, and the lever 30 is rotatably installed within the actuator housing 10 to be rotated about the pivoting point R. The pivoting point R may be rotatably installed by a pin.

A bearing for reducing a frictional force with the movable member 20 may be installed at the force point F1 of the lever 30 pushed by the movable member 20, and the bearing may be a roller bearing RB. A bearing may be installed at an end of the release fork 50 coupled to an opposite end of the lever 30, that is, an end of the second length element 32 such that the release fork 50 is smoothly linearly moved within the actuator housing 10, and the bearing may be a roller bearing.

In particular, an opposite end of the second length element 32 is installed to contact an end of the release fork 50 in the process of linearly moving an end of the release fork 50 so as to roll or slide. Thus, the length b between the point W of application and the force point F1 is shortened by varying a location of the point W of application connected to an end of the release fork 50 as the second length element 32 is moved when the lever 30 is rotated by pushing the movable member 20, which increases a rotating force of the lever 30 by the principle of a lever In this case, a pulling rod 52 may be coupled to the release fork 50 and an end of the pulling rod 52 may be coupled to an opposite end of the lever 30, in which case a shaft of the pulling rod 52 is disposed parallel to a shaft of the motor M such that the pulling rod 52 is linearly moved as the movable member 20 is linearly moved.

Figure 4:
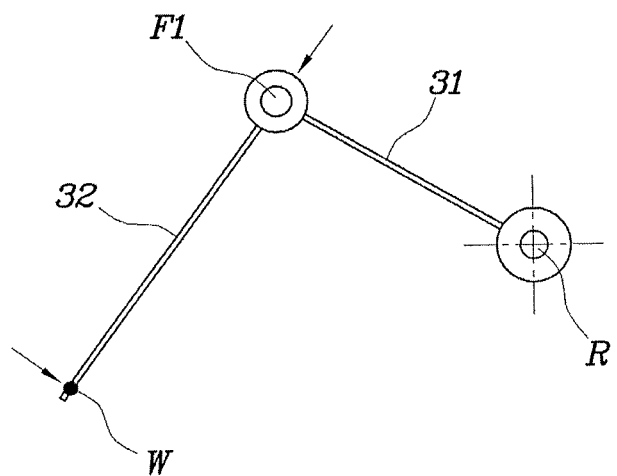
FIG. 4 is a view illustrating an exemplary operation of doubling a force by the principle of a third class lever in a lever according to the present invention.

In a detailed description with reference to FIGS. 2 and 4, the pivoting point R is a support point rotated by a pin, a middle point of the lever 30 pushed by the movable member 20 is the force point F1, and an opposite end of the lever 30 coupled to the release fork 50 is the point W of application, such that if the force point F1 is pushed by the movable member, the lever 30 is rotated about the support point according to the principle of a third class lever to apply a force to the point W of application.

In this case, the length b between the force point F1 ad the point W of application is shortened and an angle θ illustrated in the drawing is reduced, so that a rotating force of the lever 30 is added to a driving force provided by the power generating unit. Accordingly, the lever 30 is rotated by a rotating force larger than a driving force of the power generating unit to operate a high load of the clutch with a power generating unit of a small capacity.

In the present invention, the power generating unit may be a motor M, and a shaft of the motor M and the movable member 20 may be connected by means of a ball screw 22 such that a rotation of the motor M is converted into a linear movement of the movable member 20.

That is, a fuel efficiency problem generated due to a hydraulic loss and so on of a conventional hydraulic actuator can be solved by employing the motor M electrically driven by power for rotating the lever 30.

As described above, a structure of a ball screw 22 may be applied to convert rotation of the motor M to linear movement as the motor M is applied, a structure of an apparatus for converting movement directions can be reduced.

In the present invention, as one surface of the movable member 20 pushing the lever 30 may be inclined, the lever 30 is rotated while the lever 30 is frictionally moved along the inclined surface of the movable member 20 when the lever 30 is pushed by the movable member 20.

That is, the movable member 20 has a wedge shape having an inclined surface. The force point F1 of the lever 30 is pushed by the inclined surface of the movable member 20 and the force point F1 of the lever 30 is moved while contacting the inclined surface of the movable member 20 as the movable member 20 is linearly moved.

In the present invention, the inclined surface of the movable member 20 has a shape of a flat surface. In the present invention, the inclined surface of the movable member 20 has a shape of a curved surface.

Figure 3:
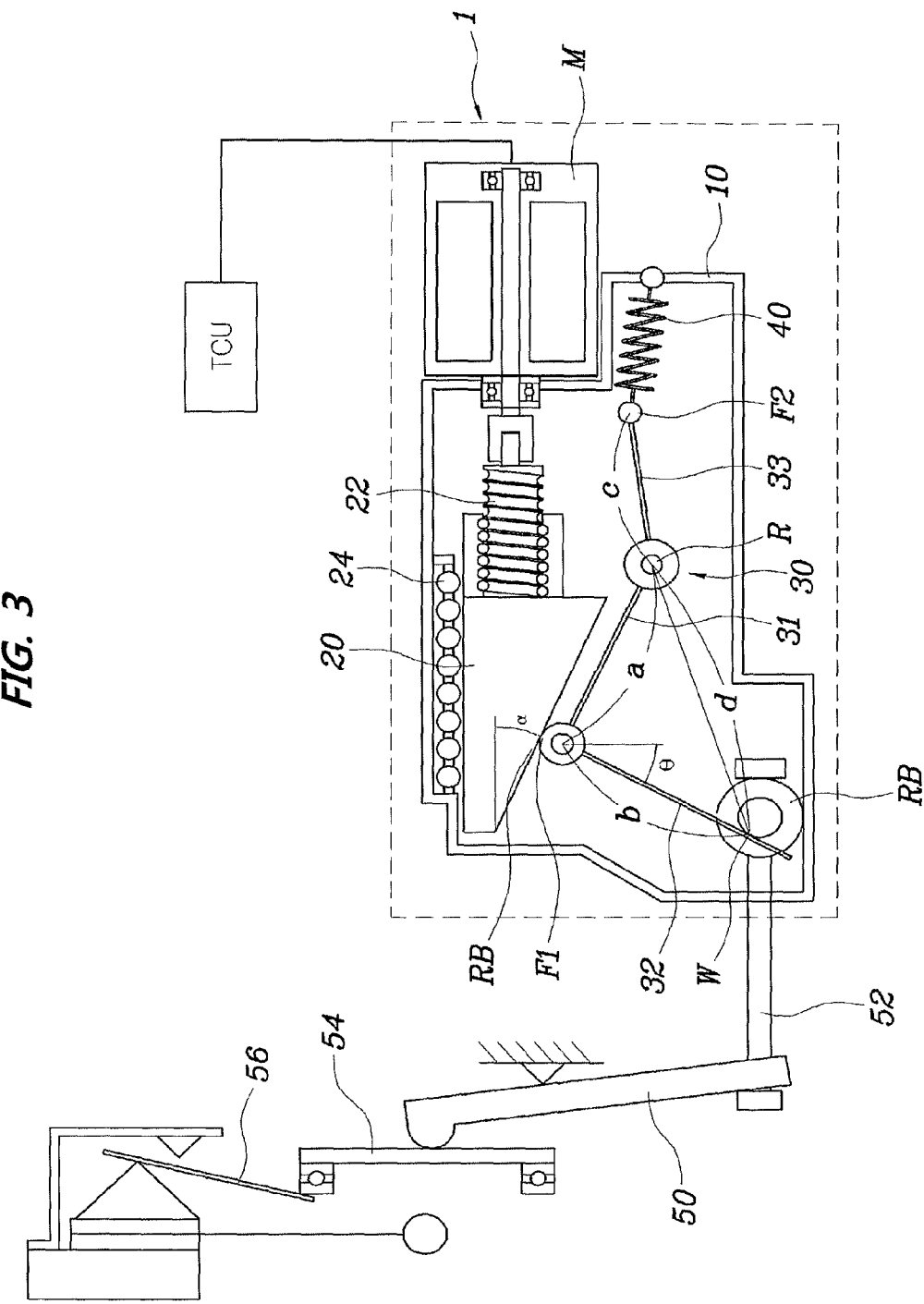
FIG. 3 is a view illustrating a structure of the clutch actuator of FIG. 2 after the operation of the clutch actuator.

That is, as illustrated in FIGS. 2 and 3, when the inclined surface of the movable member 20 has a shape of a flat surface, the inclination angle α on one surface of the movable member 20 is always constant on all inclined surfaces, and thus the release fork 50 is constantly moved in proportion to a displacement by which the movable member 20 is moved when the movable member 20 is moved.

In various embodiments, when the inclined surface of the movable member 20 has a shape of a curved surface, the inclined surface of the movable member 20 has a shape of a cam so that the release fork 50 can be variably moved.

Here, the inclined surface of the movable member 20 may have any shape of a flat surface and a curved surface if necessary or may have a complex shape where a flat surface and a curved surface are combined.

In the present invention, a bearing 24 is installed at an opposite side of the movable member 20 to which a repulsive force is applied as the movable member 20 pushes the lever 30. That is, the bearing 24 is installed within the actuator housing 10 and the movable member 20 is installed to contact the bearing 24, so that when the movable member 20 pushes the lever 30, a frictional force of the movable member 20 is reduced by the bearing 24. Accordingly, the movable member 20 can be smoothly moved. In this case, the bearing 24 may be a needle roller bearing.

Meanwhile, in the present invention, one end of a third length element 33 may be fixed to an opposite side of the pivoting point R such that the third length element 33 is configured to rotate with the lever, and a resilient member 40 may be resiliently provided at an opposite end of the third length element 33 to provide a resilient force pushing out the third length element 33 in a direction where the lever 30 is rotated during rotation of the lever 30, increasing a rotating force of the lever 30.

Here, one end of the resilient member 40 is rotatably coupled to the third length element 33 and an opposite end of the resilient member 40 is rotatably coupled to an inner surface of the actuator housing 10, so that when the lever 30 is rotated, the resilient member 40 applies a force pushing out the third length element 33 in a rotation direction thereof in conjunction with the rotation of the third length element 33. Then, the resilient member 40 may be a spring for providing a resilient force during a compression thereof.

Figure 5:
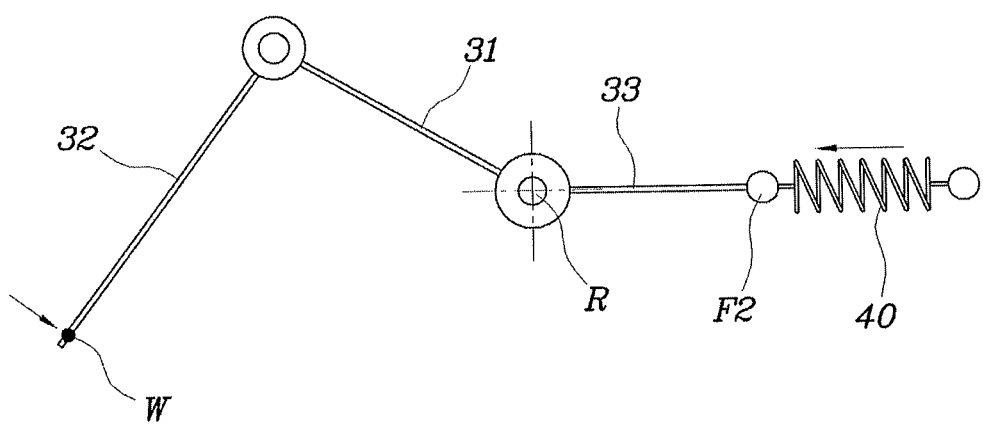
FIG. 5 is a view illustrating an exemplary operation of doubling a force by the principle of a first class lever in a lever according to the present invention.

In a detailed description with reference to FIGS. 2 and 5, the pivoting point R is a support point rotated by a pin, a part providing a resilient force to the third length element 33 by means of a spring is the force point F2, and an opposite end of the lever 30 coupled to the release fork 50 is the point W of application, such that if the spring applies a resilient force to the third length element 33, the lever 30 is rotated about the support point according to the principle of a first class lever to apply a force to the point W of application.

In this case, the length b between the force point F1 and the point W of application is shortened and a length d between the support point and the point W of application is shortened, so that a resilient force of the spring is added to a rotating force of the third length element 33 rotated by the driving force of the motor M. Accordingly, the lever 30 and the third length element 33 are rotated by a rotating force larger than a driving force of the power generating unit to operate a high load of the clutch with the motor M of a small capacity.

Figure 6:
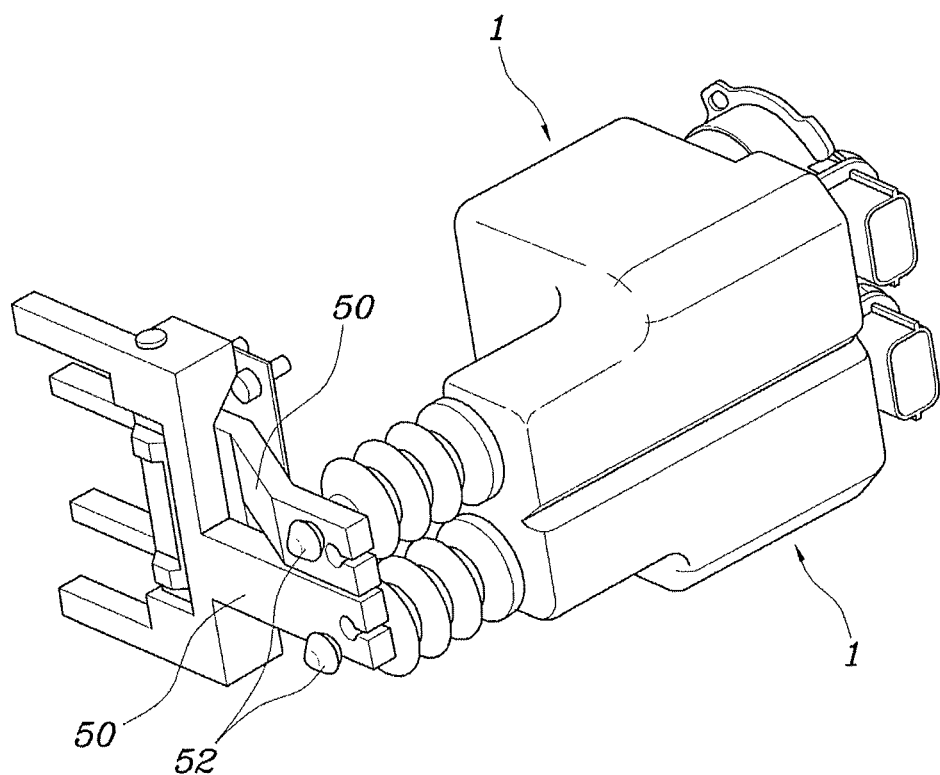
FIG. 6 is a view illustrating an exemplary structure for applying the clutch actuator according to the present invention to a double clutch.

Meanwhile, in the present invention, as illustrated in FIG. 6, a plurality of clutch actuators 1 may be installed, and the release forks 50 may be independently installed in clutches provided in a double clutch such that ends of the levers 30 installed in the clutch actuators 1 are coupled to the release forks 50, respectively.

That is, two clutch actuators 1 may be modulized to be utilized as a clutch actuator 1 for a double clutch transmission (DCT). In this case, the two clutch actuators 1 may be modulized in parallel, and the two release fork 50 provided in the clutches, respectively, may be disposed parallel to each other to form a module together with the clutch actuators 1.

Referring to FIGS. 2 and 3, an operation and an effect of the present invention will be described in detail.

If the motor M is automatically electrically controlled by a transmission control unit (TCU) to be rotated, the movable member 20 is linearly moved by the ball screw 22.

Then, the movable member 20 pushes the force point F1 of the lever 30 and the lever 30 is rotated about the pivoting point R to provide a resilient force for pushing out the third length element 33 by using a spring.

In addition, the roller bearing RB provided at an end of the release fork 50 is pulled, the release fork 50 is seesawed to be rotated, and the release bearing 54 and the diaphragm spring 56 is operated, operating a pressure plate to operate the clutch.

As described above, in the present invention, the lever having the first length element 31 and the third length element 33 is rotated due to the combination of the principles of a first class lever and a third class lever. That is, the resilient force of the spring forms the point W of application by the principle of a first class lever, and a pushing force of the movable member 20 forms the point W of application by the principle of a third class lever. The two forces are combined to overcome a high load of the clutch.

That is, referring to the drawings, when the lever 30 is rotated about the pivoting point R, the lengths a and c of the first length element 31 and the third length element 33 are not changed, but the straight line length d from the pivoting point R to the point W of application is shortened together with the second length element 32 where the point W of application is formed. That is, the point W of application is varied.

Further, when the lever 30 is rotated about the pivoting point R an angle θ between an imaginary point vertically below a portion of the force point F1 of the movable member 20 and the point W of application is shortened, the second length element 32 and the angle θ are varied. Accordingly, a rotating force of the lever 30 is doubled and a high load of the clutch can be operated by a motor M of a small capacity.

In an aspect of the force point F2 applied by the spring, since the straight line length d between the pivoting point R and the point W of application is shortened, a resilient force by the spring is double.

According to the present invention, rotating forces of a lever and a third length element can be amplified by using the principles of a first class lever and a third class lever to operate a clutch of a high load while using a motor of a small capacity. Accordingly, fuel efficiency can be improved by reducing a current consumption of the motor and a weight of the actuator can be reduced by using a motor of a small capacity.

Moreover, the present invention can be applied to an automated manual transmission of a double clutch transmission type through a plurality of clutch actuators.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch actuator for a vehicle, comprising:
   a movable member connected to a power generating unit and configured to be linearly moved by power provided by the power generating unit; and
   a lever which has a pivoting point at one end thereof and to which a release fork is connected at an opposite end thereof to provide a point of application, the lever being configured such that a location of the point of application is varied such that the lever is rotated about the pivoting point when a force point is pushed by the movable member and a length between the point of application and the force point is shortened when the lever is rotated about the pivoting point and a rotating force of the lever is improved as the point of application is moved toward the pivoting point.

2. The clutch actuator of claim 1, wherein a first length element connects the pivoting point and the force point, a second length element connects the force point and the point of application, and the length between the force point and the point of application is shortened as the second length element is frictionally moved along an end of the lever connected to the release fork when the lever is rotated about the pivoting point.

3. The clutch actuator of claim 1, wherein the lever is formed in a bent shape toward the movable member at a portion of the force point.

4. The clutch actuator of claim 1, wherein the power generating unit is a motor, and a shaft of the motor and the movable member are connected by means of a ball screw such that a rotation of the motor is converted into a linear movement of the movable member.

5. The clutch actuator of claim 1, wherein as one surface of the movable member pushing the lever is inclined, the lever is rotated while the lever is frictionally moved along the inclined surface of the movable member when the lever is pushed by the movable member.

6. The clutch actuator of claim 5, wherein the inclined surface of the movable member has a shape of a flat surface.

7. The clutch actuator of claim 5, wherein a bearing is installed at an opposite side of the movable member to which a repulsive force is applied as the movable member pushes the lever.

8. The clutch actuator of claim 1, wherein one end of a third length element is fixed to an opposite side of the pivoting point, and a resilient member is resiliently provided at an opposite end of the third length element to provide a resilient force pushing out the third length element in a direction where the lever is rotated during rotation of the lever, increasing a rotating force of the lever.

9. The clutch actuator of claim 8, wherein the resilient member is a spring.

10. The clutch actuator of claim 1, wherein a plurality of clutch actuators are installed, and the release forks are independently installed in clutches provided in a double clutch such that ends of the levers installed in the clutch actuators are coupled to the release forks, respectively.

* * * * *